C. G. HOUSE.
ANIMAL RELEASING DEVICE.
No. 191,431. Patented May 29, 1877.
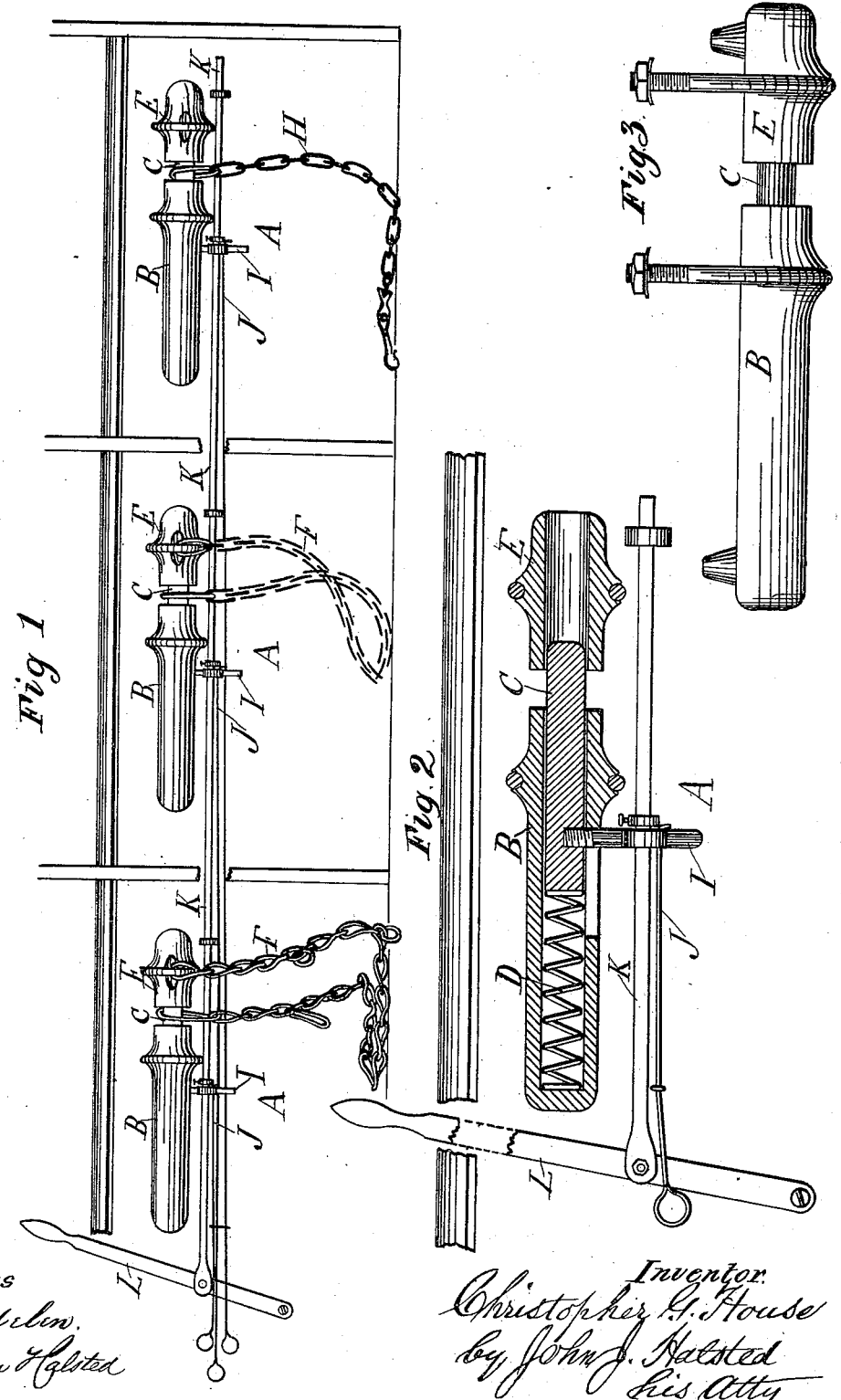

UNITED STATES PATENT OFFICE.

CHRISTOPHER G. HOUSE, OF AURORA, ILLINOIS.

IMPROVEMENT IN ANIMAL-RELEASING DEVICES.

Specification forming part of Letters Patent No. 191,431, dated May 29, 1877; application filed April 2, 1877.

*To all whom it may concern:*

Be it known that I, CHRISTOPHER G. HOUSE, of Aurora, in the county of Kane and State of Illinois, have invented certain new and useful improvements in apparatus for fastening live stock in their stalls and for readily releasing them; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of this invention is to afford a means for instantly fastening live stock, such as horses and cattle, in their stalls, and as readily releasing them; and also to permit the releasing of one, or any number of, or all of them at once, as may be desired.

In the drawings illustrating my invention, A represents the wood-work of the front part of the manger; B, a case or cylinder firmly secured thereto, and preferably made of cast-iron, and with their flat sides, which are adjacent to or in contact with the wood, provided with spurs, adapted to project into the wood and keep the case steady. These cases B are fastened firmly to the manger by means of staples and nuts. Within each case B is a bolt, C, the end of which is, in its normal or general position, always thrown forward into the bore of the short receiver or case E by the pressure exerted by a coil-spring, D, within the case B; and the bolt is adapted to be moved backward against the force of the spring by means of the arm I projecting from the bolt through a slot in the under side of the case, this slot permitting the range of movement required.

F is a chain, fastened permanently to the case E or to the staple which holds it to the manger or stall. It is furnished with one or more round links or rings, as shown, and with an elongated link at its free end. H is another, but loose, detached chain, for a purpose hereinafter named, provided with an elongated link at one end, and a snap-hook at the other.

J is a pull-wire directly connected with the arm I of the bolt, and passing through any appropriate guides or eyes, and terminating in a loop or other handle at any convenient place of distance from the stall. The pulling of this wire will instantly withdraw the bolt to which it is connected from its short tube or case and release the chain which it may have held, and thus set free the animal fastened in his stall by such chain and bolt.

In a series of stalls, however many in number, each supplied with one of these self locking or closing bolts, each may thus be furnished with its own special pull-wire, and the whole of these wires may extend to the same place, as shown in the drawings, and thus the attendant, from such selected convenient spot, may at will release any one or more, at option, of the animals chained in his stall, but without disturbing any of the bolts which hold the remaining animals. But there are frequent occasions where it is desirable to release all the cattle or horses at once, as in the morning, or for watering, or in case of fire or other sudden emergency. To effect this a continuous rod, K, extends the length of the whole series of spring-bolts, and is provided with stops or nuts which, when the rod is pulled, come in contact severally with the arms I of the bolts, and operate all the bolts together. A hand-lever, L, connected with the rod K, is located conveniently, and made with sufficient leverage to make this action easy for the attendant.

Cattle being driven into their stalls, an attendant goes into each stall and puts the chain F around the neck of the animal, and drawing back the bolt by means of its arm I sufficiently to slip the bolt through the elongated link. This last-named link should first, however, pass through one or both of the round links of the chain. The chain should be provided with another elongated link at some distance from its end, to adapt the same chain for fastening small as well as large animals.

For fastening horses the chain, secured to E, needs no round links; but the elongated end link is first passed through the ring of an ordinary strap-halter, and the bolt slipped through this link; or a loose chain, with a snap-hook at one end and an elongated link at the other, is all sufficient, the snap-hook being snapped into the ring of the halter, and the elongated link connected with the bolt.

In either case, the horses are released in the same manner as above described for the cattle.

I claim—

1. The combination, with the spring-bolt and its case, and with the bolt receiver or case E, of the pull-wire J for withdrawing a single bolt, substantially as shown and described.

2. In combination with a series of spring-bolts and bolt-receivers, as described, a series of pull-wires, J, applied severally one for each bolt, and all reaching or extending to the same part of the barn or building, whereby the attendant may, at will, disconnect any given chain or chains from its bolt without disturbing the remainder.

3. In combination with a series of spring-bolts and bolt-receivers, a series of pull-wires severally connected, one to each bolt, and a continuous rod adapted for operating all the bolts simultaneously, permitting the attendant, while standing at a given spot, to release, at option, any one or more or all of the chains or halters, substantially as and for the purposes set forth.

CHRISTOPHER G. HOUSE.

Witnesses:
WILLIAM W. BISHOP,
FRANK W. BISHOP.